(12) United States Patent
Cho et al.

(10) Patent No.: US 6,185,017 B1
(45) Date of Patent: Feb. 6, 2001

(54) DIFFRACTIVE DEFLECTION BEAM SCANNING SYSTEM

(75) Inventors: Sung-min Cho; Won-hyung Lee, both of Seoul; Hwan-young Choi, Anyang; Moon-gyu Lee, Suwon; Jee-hong Min; Young-il Kim, both of Yongin; Jin-seung Choi; Jae-yong Eum, both of Suwon, all of (KR)

(73) Assignee: Samsung Electronics., Ltd., Kyungki-Do (KR)

( * ) Notice: Under 35 U.S.C. 154(b), the term of this patent shall be extended for 0 days.

(21) Appl. No.: 09/436,753

(22) Filed: Nov. 9, 1999

(30) Foreign Application Priority Data

Nov. 13, 1998 (KR) ................................................ 98-48646

(51) Int. Cl.$^7$ ...................................................... G02B 5/32
(52) U.S. Cl. .......................... 359/18; 359/204; 359/209; 347/241; 347/243
(58) Field of Search ............................... 359/17, 18, 204, 359/209; 235/457, 462.34; 347/241, 243

(56) References Cited

U.S. PATENT DOCUMENTS

| | | |
|---|---|---|
| 4,600,266 | 7/1986 | Omi . |
| 4,761,046 * | 8/1988 | Funato .................................... 359/18 |
| 5,295,004 | 3/1994 | Hasegawa et al. ..................... 359/17 |
| 5,457,550 | 10/1995 | Baba et al. ............................. 359/18 |
| 6,018,409 * | 1/2000 | Eum et al. ........................... 359/204 |

FOREIGN PATENT DOCUMENTS

| | | |
|---|---|---|
| 62-266517 | 11/1987 | (JP) . |
| 4-52619 | 2/1992 | (JP) . |

* cited by examiner

Primary Examiner—Darren Schuberg
(74) Attorney, Agent, or Firm—Sughrue, Mion, Zinn, Macpeak & Seas, PLLC

(57) ABSTRACT

A diffractive deflection beam scanning system including: a plurality of light sources; a deflection disc rotatably mounted over the light sources, having patterns capable of diffracting and deflecting beams emitted from the light sources; a plurality of first reflecting mirrors for changing the traveling paths of beams diffracted and deflected by the deflection disc; a plurality of second reflecting mirrors for reflecting the beams reflected by the first reflecting mirrors in a beam scan direction, wherein the light sources are disposed in a straight line along a bisecting line of the deflection disc, perpendicular to the beam scan direction, and the second reflecting mirrors are arranged over the center of the deflection disc at different heights.

5 Claims, 10 Drawing Sheets

DIFFRACTIVE DEFLECTION BEAM SCANNING SYSTEM

BACKGROUND OF THE INVENTION

1. Field of the Invention

The present invention relates to beam scanning systems for use in an electrophotographic type image forming apparatus and, more particularly, to a beam scanning system for diffracting and deflecting beams emitted from light sources using a disc, in which the arrangement of reflecting mirrors that reflect the diffracted and deflected beam toward a photosensitive medium is improved.

2. Description of the Related Art

In general, beam scanning systems are employed by electrophotographic image forming apparatuses for use in forming an electrostatic latent image on a photosensitive medium such as a photoreceptor web by, for example, scanning beams emitted from a laser scanning unit and a light source. Recently, a multi-beam scanning system which diffracts and deflects beams emitted from light sources by adopting a rotary deflection disc, instead of by adopting a rotary polygon used in a conventional beam scanning system, has been introduced. FIG. 1 shows a schematic configuration thereof.

Referring to FIG. 1, the beam scanning system includes a light source 10 and a deflection disc 11 rotatably mounted over the light source 10. The deflection disc 11 is coupled to a driving motor 12 which rapidly rotates the deflection disc 11. The deflection disc 11 includes a plurality of sectors having diffraction patterns formed on the surface thereof.

A beam emitted from the light source 10 is diffracted by the diffraction patterns while passing through a rotating deflection disc 11. Since the diffraction patterns are formed to have different diffraction angles according to the rotation angle of the deflection disc 11, beams that are emitted from the same light source 10, are diffracted at different angles with the rotation of the deflection disc 11, to create a single scanline of beams. The beams diffracted by the deflection disc 11 are reflected by a plurality of reflecting mirrors 13 and 14, so that the traveling direction is changed.

The reflected beams come to pass through a beam correction means. In general, the beam correction means includes a condensing mirror 15 for condensing and reflecting the beam, and an hologram element 16 for diffracting and transmitting the beam to direct the beam toward a photosensitive medium (not shown) such as a photoreceptor web. Alternatively, the beam correction means may be replaced with an F-θ lens (not shown) that corrects the focal position and scanwidth of the beam. The F-θ lens corrects aberrations of the beam scanned in a primary scan direction and sets the form of the beam as the deflection disc 11 rotates.

Through the above operations, beams emitted from the light source 10 can form a scanline on the photoreceptor web in the primary scan direction, that is, in a direction perpendicular to the traveling direction of the photoreceptor web.

Only one light source 10 is illustrated in FIG. 1. However, a color printer needs a plurality light sources for the colors of yellow A), magenta (M), cyan (C) and black (B). A deflection disc 20 and a plurality of light sources 21, 22, 23 and 24, of a multi-beam scanning system that requires a plurality of light sources, are illustrated in FIG. 2. As the diffraction disc 20 rotates, beams emitted from each of the light sources 21, 22, 23 and 24 diffract and transmit the diffraction patterns formed on each different sector of the deflection disc 20 to create scanlines L1, L2, L3 and L4, respectively. The scan directions of the scan lines L1, L2, L3 and L4 are tangential with respect to the deflection disc 20.

In the multi-beam scanning system, after the beams emitted from the light sources 21, 22, 23 and 24 are diffracted and deflected by the deflection disc 20, the traveling paths of the beams are changed toward the same direction, that is, the X-axis direction, to scan beams parallel onto a photoreceptor web (not shown). For the parallel scanning of the beams, as shown in FIG. 3, there are disposed a plurality of first reflecting mirrors 31, 32 and 33 and a plurality of second reflecting mirrors 41, 42, 43 and 44 over the deflection disc 20. That is, beams emitted from the light sources 21, 22 and 23 are diffracted and deflected while passing through each different sector of the deflection disc 20, are reflected by the first reflecting mirrors 31, 32 and 33, and are then reflected by the second reflecting mirrors 41, 42 and 43, thereby heading in the X-axis direction. Also, the beam emitted from the light source 24 (see FIG. 2), which is diffracted and deflected by the deflection disc 20, is reflected by another first reflecting mirror (not shown) and the second reflecting mirror 44 in sequence, thus heading in the X-axis direction.

Preferably, the second reflecting mirrors 41, 42, 43 and 44 are arranged over the center of the deflection disc 20 at different heights, as shown in FIG. 3, for easy arrangement and scanline stability. However, in the case where the light sources 21, 22, 23 and 24 are symmetrically disposed with respect to the center of the deflection disc 20, as shown in FIGS. 2 and 3, directions of each scanline do not coincide with each other. The problem associated with the symmetrical arrangement of the light sources will be described in greater detail with reference to FIGS. 4A through 4D.

FIG. 4A illustrates the path of beams emitted from the light source 24. That is, a beam emitted from the light source 24 is reflected by the first reflecting mirror 34, and the scanline thereof heads in the X-axis direction. Then, the beam is reflected again by the second reflecting mirror 44 disposed over the center of the deflection disc 20, so that the scanline heads in the −Y-axis direction as indicated by an arrow D1. Similarly, as shown in FIGS. 4B and 4C, scanlines of beams reflected by the first mirrors 32 and 33 and then reflected by the second reflecting mirrors 42 and 43, respectively, which have been emitted from the light sources 22 and 23, also head in the −Y-axis direction as indicated by each arrow D1.

However, referring now to FIG. 4D, the scanline of the beam, which is emitted from the light source 21 and then reflected by the first and second reflecting mirrors 31 and 42 in sequence, heads in the Y-axis direction as indicated by an arrow D2, which is opposite to the scanline directions D1 of the beams emitted from the light sources 22, 23 and 24. Such noncoincidence of the scanline directions must be corrected by an additional circuit or mechanical device prior to scanning it onto a photoreceptor web.

To avoid noncoincidence of the scanline directions, which occurs where the light sources 21) 22, 23 and 24 are symmetrically arranged with respect to the center of the deflection disc 20, a configuration shown in FIG. 5 has been suggested, where all light sources 51, 52, 53 and 54 are arranged within one section divided by a bisecting line S, which passes through the center of a deflection disc 50 and is parallel to the Y-axis.

The light sources 51, 52, 53 and 54 are disposed at an intermediate angle that measures 60°. The arrangement of the light sources 51, 52, 53 and 54, which is illustrated in FIG. 5, provides an advantage of providing the same scanline directions. However, there is a problem associated with asymmetry of scanlines from a light source, which will be described below with reference to FIG. 6.

FIG. 6 shows the path of the beam emitted from the light source 52. The beam emitted from the light source 52 is diffracted and deflected by a predetermined pattern of the rotating deflection disc 50, and is then reflected by a reflecting mirror 55 disposed over the center of the deflection disc 50, so that it heads in the X-direction. Here, a central beam B1 of scanlines travels along a central line C, which is parallel to the X-axis, after being reflected by the reflecting mirror 55. But side beams B2 and B3, which are scanned onto boundaries relative to a central region scanned by the center beam B1, form a predetermined angle with the X-axis. The side beams B2 and B3 are emitted from the light source 52 with the same angle with respect to the central beam B1, however, intermediate angles θ1 and θ2 of the side beams B2 and B3 with respect to the central beam B1, after being reflected by the reflecting mirror 55, are different. That is, the intermediate angle θ1 between the side beam B2 and the central beam B1 is smaller than the intermediate angle θ2 between the side beam B3 and the central beam B1. The asymmetry of scanlines, as denoted by the distances T1 and T2 from the central line C, degrades reliability in forming an image and also requires an additional complicated device capable of correcting the asymmetry of scanlines.

SUMMARY OF THE INVENTION

To account for the problems, an object of the present invention is to provide a diffractive deflection beam scanning system adopting a deflection disc, in which a plurality of light sources are disposed in a straight line perpendicular to the beam scan direction, so that beams emitted from each light source remain symmetrical even after being reflected by reflecting mirrors.

To achieve the above object of the present invention, there is provided a diffractive deflection beam scanning system comprising: a plurality of light sources; a deflection disc rotatably mounted over the light sources, having patterns capable of diffracting and deflecting beams emitted from the light sources; a plurality of first reflecting mirrors for changing the traveling paths of beams diffracted and deflected by the deflection disc; a plurality of second reflecting mirrors for reflecting the beams reflected by the first reflecting mirrors in a beam scan direction, wherein the light sources are disposed in a straight line along a bisecting line of the deflection disc, perpendicular to the beam scan direction, and the second reflecting mirrors are arranged over the center of the deflection disc at different heights. Due to the arrangement of the light source in a straight line, the scanlines of beams, which travel in the beam scan direction, remain symmetrical even after being reflected by the reflecting mirrors.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
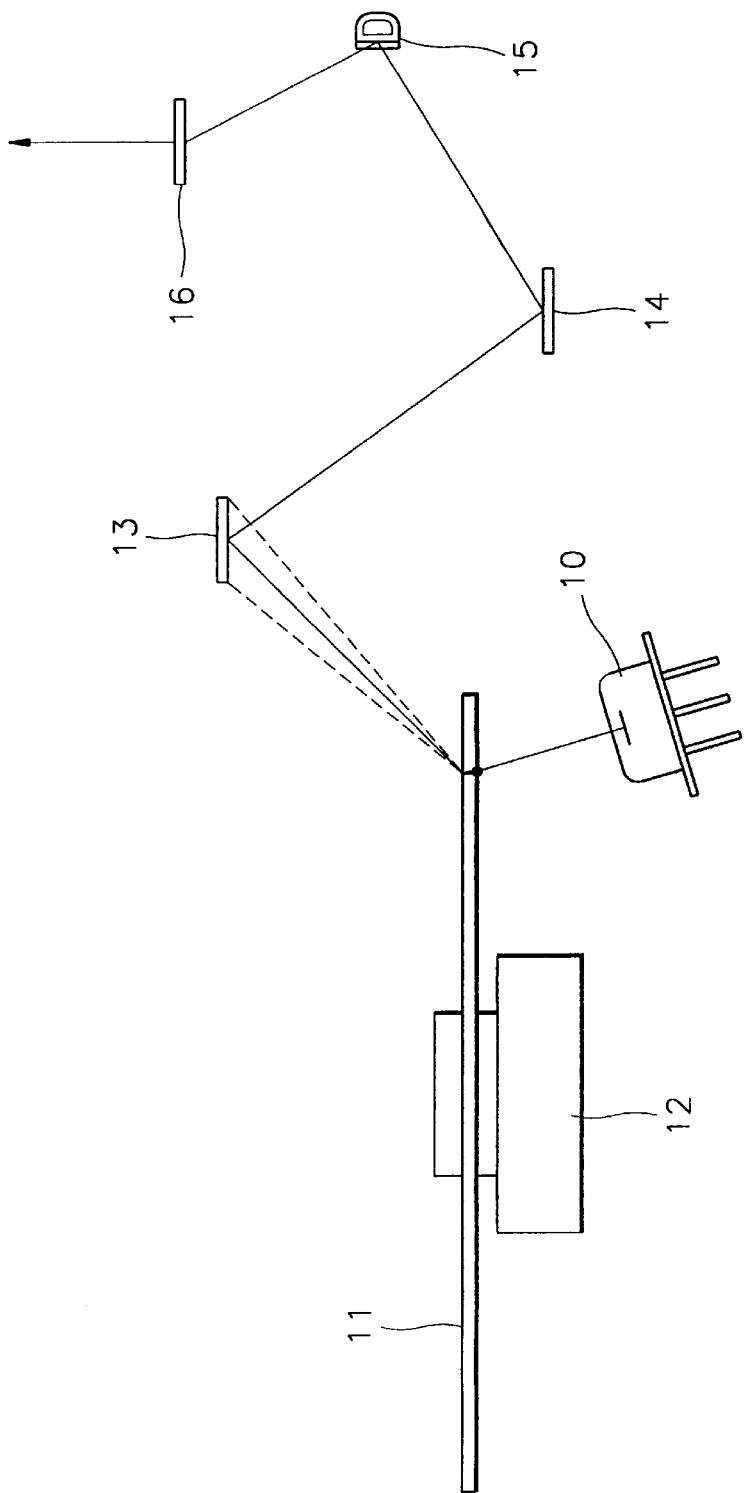
FIG. 1 is a schematic diagram showing the configuration of a conventional beam scanning system adopting a deflection disc.
Figure 2:
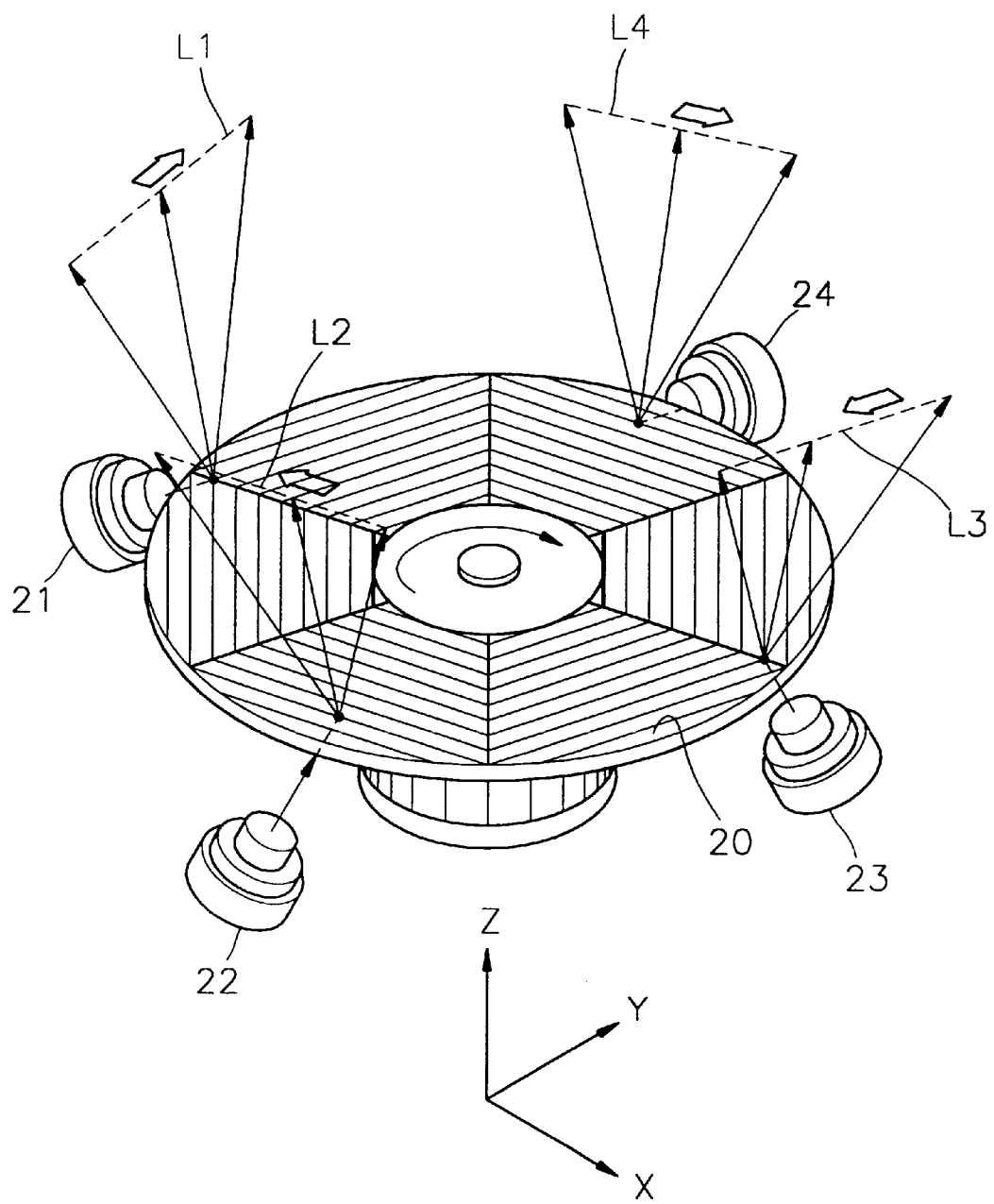
FIG. 2 is a perspective view showing the arrangement of a deflection disc and a plurality of light sources in a conventional multi-beam scanning system.
Figure 3:
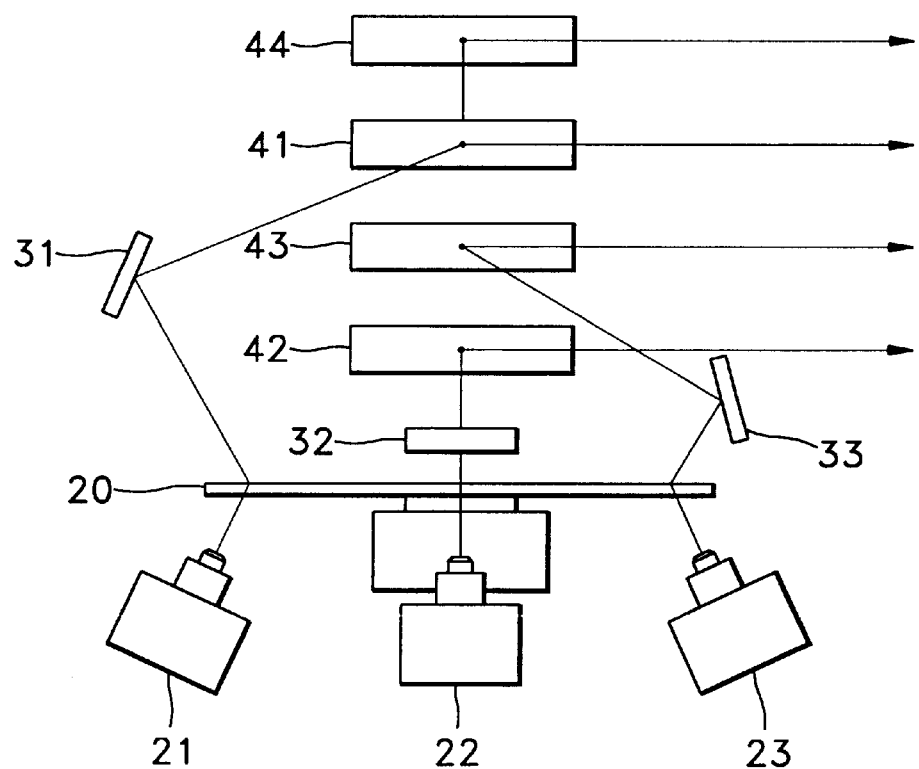
FIG. 3 is a side view of the multi-beam scanning system of FIG. 2.
Figure 4A:
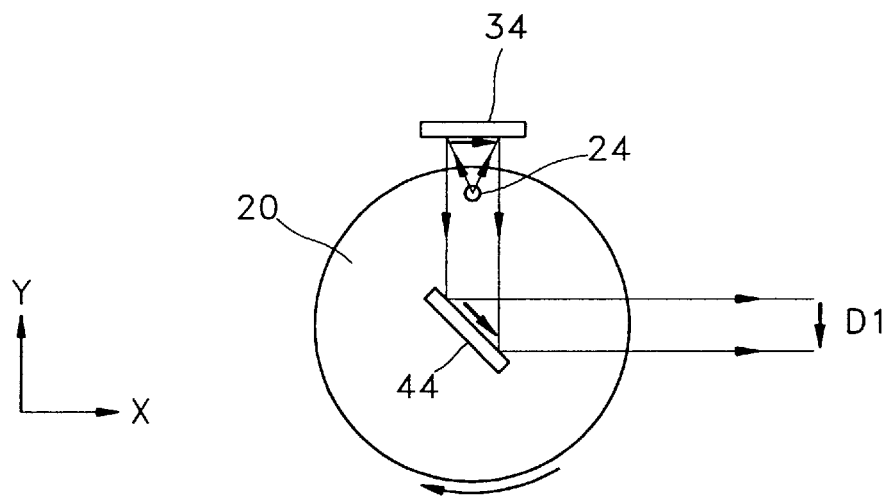
FIGS. 4A through 4D are diagrams illustrating scanline directions of beams emitted from each light source of the multi-beam scanning system shown in FIG. 1.
Figure 4B:
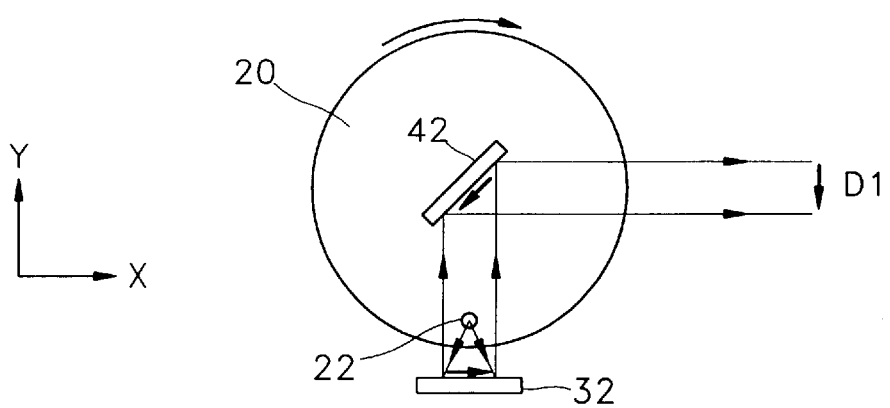
Figure 4C:
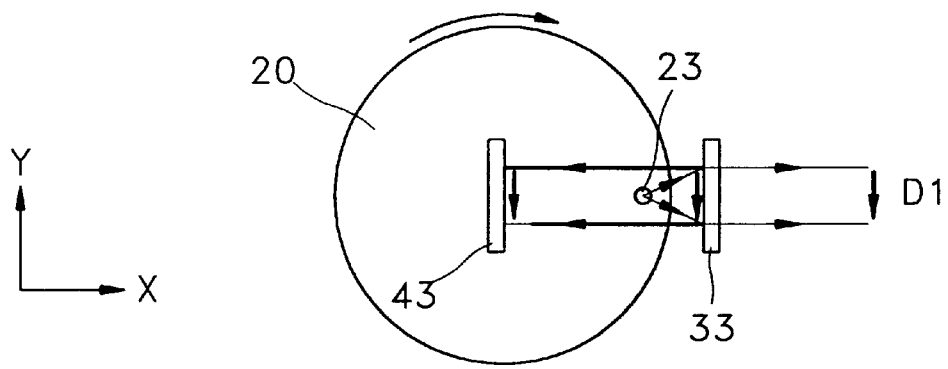
Figure 4D:
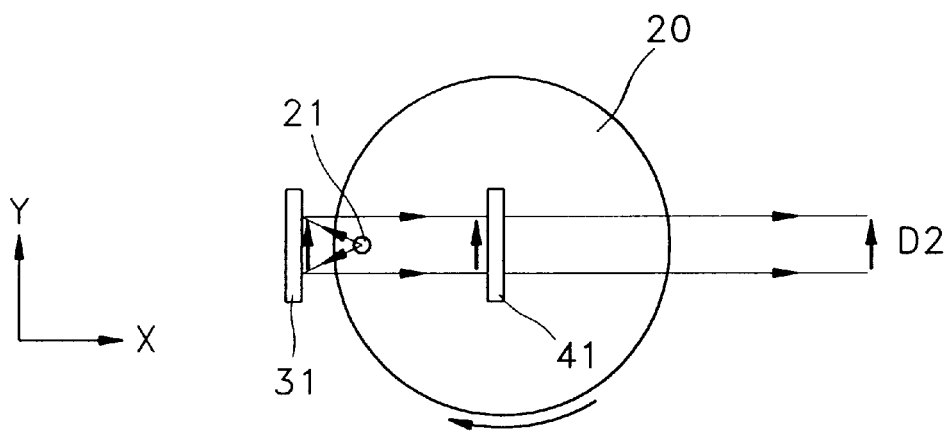
Figure 5:
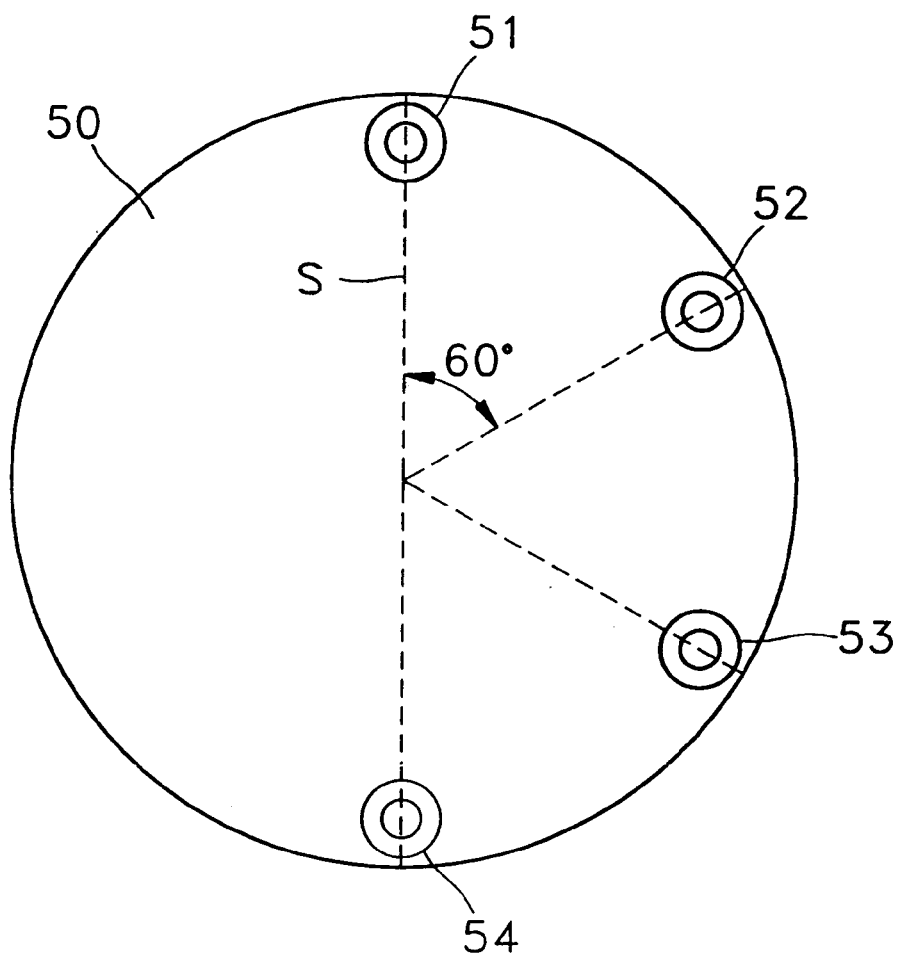
FIG. 5 is a plan view showing the arrangement of a deflection disc and a plurality of light sources in another conventional multi-beam scanning system.
Figure 5:
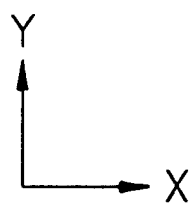
Figure 6:
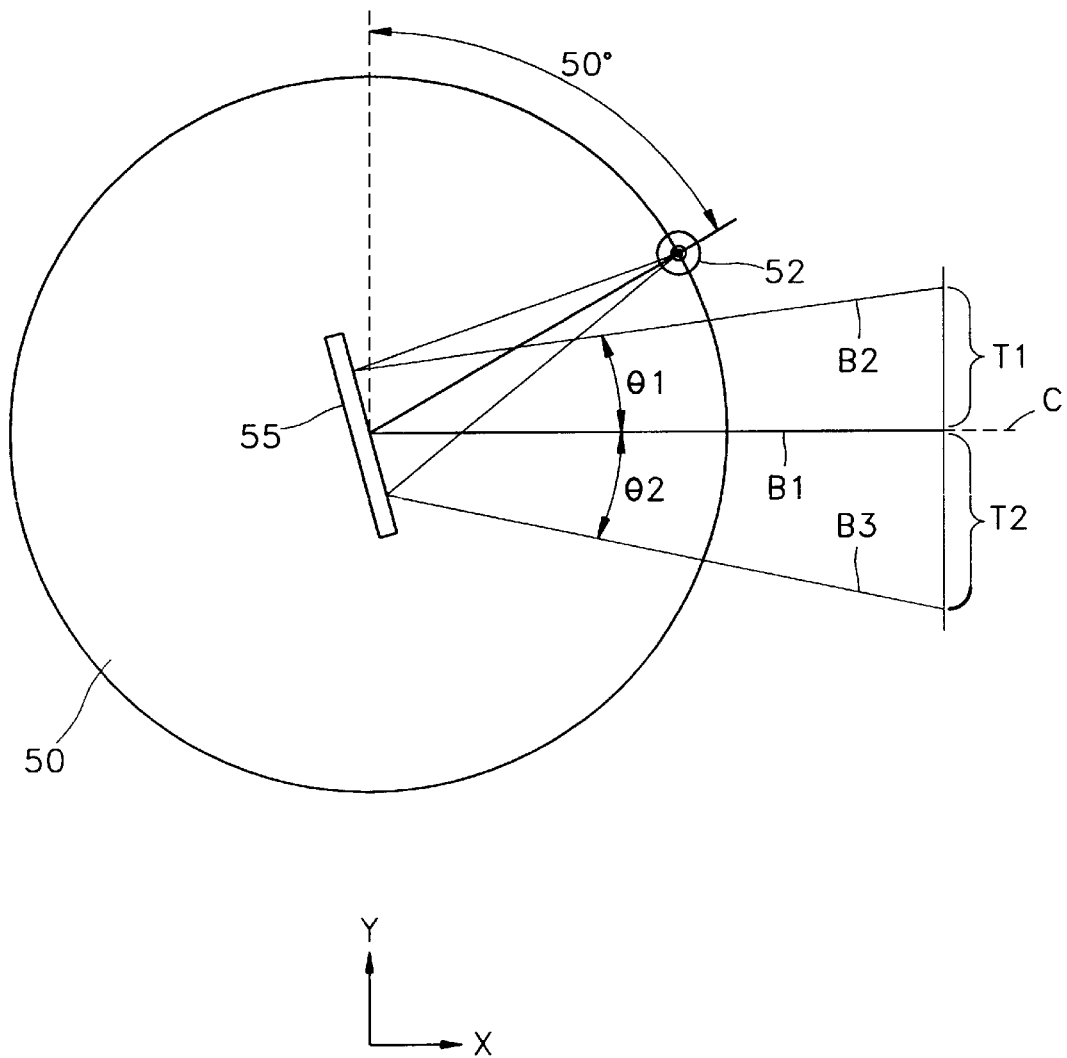
FIG. 6 is a plan view illustrating asymmetry of scanlines of a beam emitted from a light source of the multi-beam scanning system shown in FIG. 5.
Figure 7:
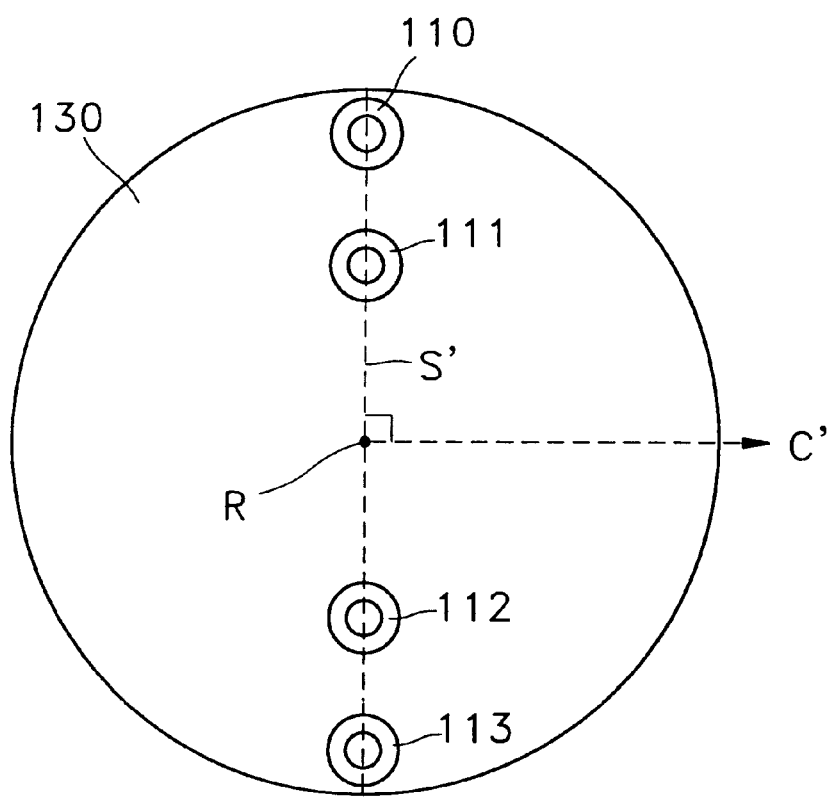
FIG. 7 is a plan view showing the arrangement of a deflection disc and light sources in a diffractive deflection beam scanning system according to the present invention.
Figure 7:
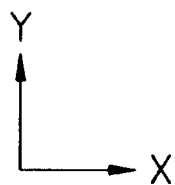

FIG. 7 illustrates the arrangement of a deflection disc 130 and a plurality of light sources 110, 111, 112 and 113 in a diffractive deflection beam scanning system according to a preferred embodiment of the present invention. The light sources 110, 111, 112 and 113 are disposed in a straight line along a bisecting line S' on which the center R of the deflection disc 130 is located.

The bisecting line S' is perpendicular to beam scan directions C' of beams which are emitted from the light sources 110, 111, 112 and 113 and then reflected by reflecting mirrors. Preferably, the light sources 110, 111, 112 and 113 are symmetrically arranged with respect to the center of the deflection disc 130, as shown in FIG. 7.

Figure 8:
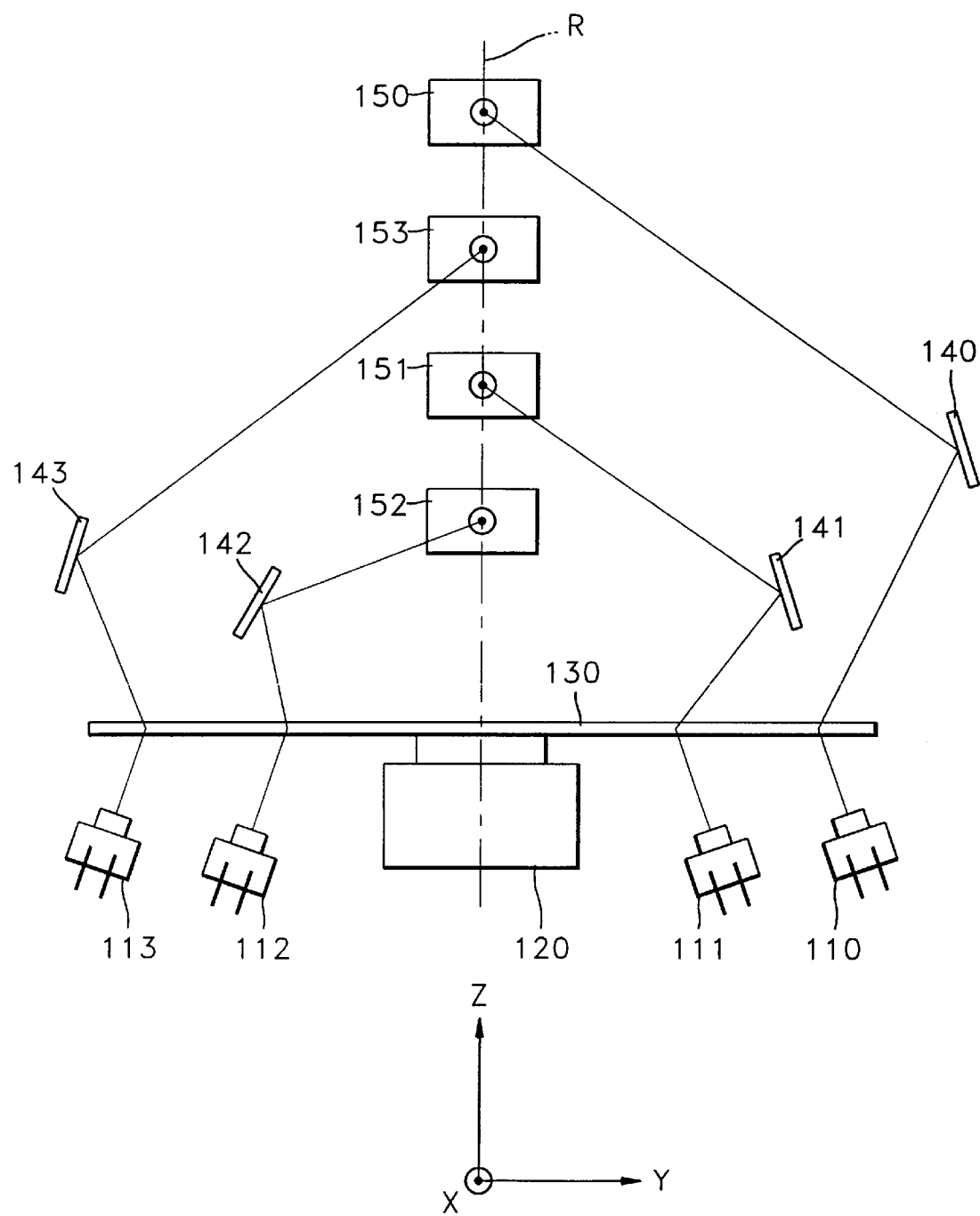
FIG. 8 is a side view of major elements of the diffractive deflection beam scanning system according to the present invention.

The overall configuration of the diffractive deflection beam scanning system according to the present invention is shown in FIG. 8. Referring to FIG. 8, the beam scanning system includes the deflection disc 130 which is rapidly rotated by a driving motor 120, the plurality of light sources 110, 111, 1112 and 113, which are arranged below the deflection disc 130 in a straight line, first reflecting mirrors 140, 141, 142 and 143 for reflecting beams, which have been diffracted and deflected upon passing through the deflection disc 130, and second reflecting mirrors 150, 151, 152 and 153 for again reflecting the beams reflected by the first reflecting mirrors 140, 141, 142 and 143, to direct the reflected beams in the beam scan direction C' (see FIG. 7), that is, in the X-axis direction.

The first reflecting mirrors 140, 141, 412, 143 are disposed in a straight line over the bisecting line S', facing the light sources 110, 111, 1112 and 113, respectively, and the second reflecting mirrors 150, 151, 152 and 153 are arranged over the center R of the deflection disc 130 at different heights. The arrangement of the first reflecting mirrors 140, 141, 142 and 143 and the second reflecting mirrors 150, 151, 152 and 153 is not limited to the above embodiment, and can be appropriately modified such that scanned beams do not intersect.

In the case of a color image forming apparatus, preferably, four light sources are provided, corresponding to the colors of yellow (Y), magenta (M), cyan (C) and black (B).

Continuous hologram patterns which diffract and deflect the beams emitted from the light sources 110, 111, 112 and 113, are formed on the deflection disc 130. Due to the hologram patterns, beams which are emitted from the light sources 110, 111, 112 and 113 and incident onto a point of the deflection disc 130, are deflected at different diffraction angles with a rotation of the deflection disc, to create a scanline.

Also, since the first reflecting mirrors 140, 141, 142 and 143 are located along a straight line over the bisecting line S', as denoted by the distances T1 and T2 from the central line C, likewise the light sources 110, 111, 112 and 113 are arranged along the bisecting line S', the first reflecting mirrors 140, 141, 142 and 143 reflect the beams, which have passed through the deflection disc 130 after being emitted from the light sources 110, 111, 112 and 113, only in the direction of the ±Y-axis. As a result, the scanlines of beams emitted from the light sources 110, 111, 112 and 113 remain symmetrical even after being reflected. Here, such symmetry of scanlines of beams reflected by the first reflecting mirrors 140, 141, 142 and 143 still remains after being reflected by the second reflecting mirrors 150, 151, 152 and 53, which will be described in greater detail with reference to FIG. 9.

Figure 9:
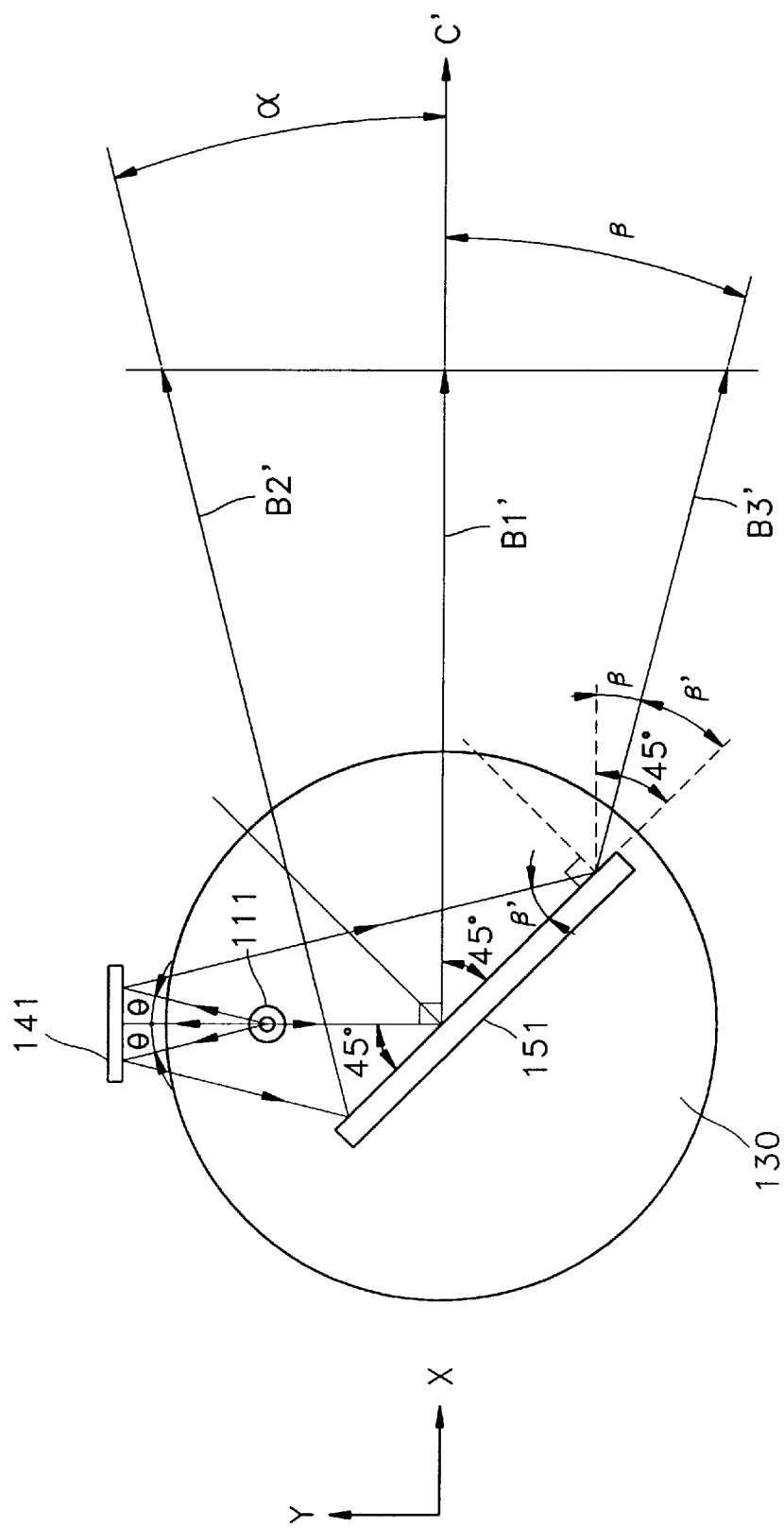
FIG. 9 is a plan view illustrating the traveling path of a beam emitted from a light source of the diffractive deflection beam scanning system according to the present invention.

FIG. 9 shows the traveling path of the beam emitted from the light source 111. A central beam B1', which has been emitted from the light source 111 and then reflected by the first reflecting mirror 141, is incident onto the second reflecting mirror 151 at an incident angle of 45° and is then reflected at an exit angle of 45°, thus traveling in the beam scan direction C' parallel to the X-axis.

When the central beam B1' and side beams B2' and B3' are emitted from the light source 111, each intermediate angle of the side beams B2' and B3' with respect to the central beam B1' is equal as 0. Assuming that intermediate angles of the side beams B2' and B3' with respect to the central beam B1' after being reflected by the first and second reflecting mirrors 141 and 151 in sequence are $\alpha$ and $\beta$, respectively, a relationship of $\alpha=\beta$ can be inferred.

In particular, for the angle $\beta$ between the side beam B3' and the central beam B1', assuming that an incident angle and exit angle of the side beam B3' with respect to the second reflecting mirror 151 are $\beta'$, the following two equations are obtained.

$$\theta=45°-\beta' \quad (1)$$

$$\beta'=\beta=45° \quad (2)$$

If we eliminate A' by combining the two equations, we obtain $$\beta=\theta \quad (3)$$

For the angle $\alpha$ between the side beam B2' and the central beam B1', if we apply similar equations to the above, $$\alpha=\theta \quad (4)$$

By rearranging the equations (3) and (4), the relationship of $\alpha=\beta$ is established. Thus, both the side beams B2' and B3' are symmetrical with respect to the central beam B1', so that the scanlines thereof also remain symmetrical.

As described above, by arranging the optical sources 110, 111, 112 and 113 in a straight line perpendicular to the beam scan direction C', the beam scanlines of beams emitted from the light sources 110, 111, 112 and 113 can remain symmetrical after being diffracted and deflected by the deflection disc 130. Therefore, a simple configuration of a beam scanning system can be implemented without the need for an additional device or a complicated configuration of reflecting mirrors, which is essential in a conventional beam scanning system to correct the asymmetrical scanlines.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A diffractive deflection beam scanning system comprising: a plurality of light sources; a deflection disc rotatably mounted over the light sources, having patterns capable of diffracting and deflecting beams emitted from the light sources; a plurality of first reflecting mirrors for changing the traveling paths of beams diffracting and deflected by the deflection disc; a plurality of second reflecting mirrors for reflecting the beams reflected by the first reflecting mirrors in a beam scan direction, wherein the light sources are disposed in a straight line along a bisecting line of the deflection disc, perpendicular to the beam scan direction, and the second reflecting mirrors are arranged over the center of the deflection disc at different heights.

2. The diffractive deflection beam scanning system of claim 1, wherein the plurality of light sources comprise four light sources.

3. The diffractive deflection beam scanning system of claim 1, wherein the first reflecting mirrors change the traveling paths of the beams, which have been emitted from the light sources and diffracted and deflected by the deflection disc, in a direction perpendicular to the beam scan direction.

4. The diffractive deflection beam scanning system of claim 1, wherein the plurality of light sources are symmetrically arranged with respect to the center of the deflection disc.

5. The diffractive deflection beam scanning system of claim 1, wherein the light sources in adjacent pairs of the plurality of light sources are not equidistantly spaced from one another.

* * * * *